(12) United States Patent
Agrawal et al.

(10) Patent No.: US 7,139,285 B2
(45) Date of Patent: Nov. 21, 2006

(54) FREQUENCY HOP COLLISION PREDICTION IN A MULTI-CHANNEL, BLUETOOTH-ENABLED PACKET TRANSMISSION SYSTEM

(75) Inventors: Prathima Agrawal, New Providence, NJ (US); David Famolari, Montclair, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 1039 days.

(21) Appl. No.: 10/016,238

(22) Filed: Dec. 10, 2001

(65) Prior Publication Data

US 2003/0108008 A1  Jun. 12, 2003

(51) Int. Cl.
 *H04L 12/43* (2006.01)
 *H04J 3/00* (2006.01)

(52) U.S. Cl. ..................... 370/458; 370/476
(58) Field of Classification Search ............. 370/310, 370/315, 338, 431, 442, 458, 461, 462, 476
See application file for complete search history.

(56) References Cited

U.S. PATENT DOCUMENTS

2002/0075941 A1* 6/2002 Souissi et al. ............... 375/133
2002/0159401 A1* 10/2002 Boger ........................ 370/294
2002/0187749 A1* 12/2002 Beasley et al. ............... 455/41
2003/0016651 A1*  1/2003 Kwok et al. ................. 370/349

* cited by examiner

*Primary Examiner*—Kevin C. Harper
(74) *Attorney, Agent, or Firm*—Joseph Giordano (57) ABSTRACT

An arrangement including a scannable matrix for predicting the occurrence of a future collision of frequency hops of the channel hopping patterns on the respective activated first paths of a Bluetooth packet transmission system is described. A first coordinate of the matrix defines columns representative of a selectable window of N successive future time slots of the channel hopping patterns, and a second coordinate of the matrix defines rows each exhibiting the successive frequency hops of the patterns segments transmitted on a separate one of the activated channels during such window. The first coordinate is scanned to detect the occurrence, if any, of identical frequency hops appearing at an intersection of the then-scanned column and at least a pair of the rows. If a particular scan does not detect an occurrence of such identical frequency hops in any of the time slots of the scanned window, the first coordinate may be incremented by a selected number of time slots at the end of the scan, and the scan is then successively repeated for each new window that results. If and when identical frequency hops are detected in a particular future time slot during a scan, the channel hopping pattern(s) on a subset of the affected channels may be suitably altered to avoid the predicted collision.

2 Claims, 5 Drawing Sheets

| F1(t) | T(0) | T(1) | T(2) | T(3) | ... | T(X) | ... | T(N-1) |
|---|---|---|---|---|---|---|---|---|
| | F(17) | F(0) | F(30) | F(36) | | F(17) | | F(12) |
| F2(t) | F(23) | F(6) | F(73) | F(14) | | F(17) | | F(55) |

| F1(t) | T(0) | T(1) | T(2) | T(3) | T(4) | T(5) | T(6) | ... | T(X-1) | T(X) | T(X-11) | ... | T(N-3) | T(N-2) | T(N-1) |
|---|---|---|---|---|---|---|---|---|---|---|---|---|---|---|---|
| | F(6) | F(6) | F(6) | F(18) | F(18) | F(18) | F(38) | | F(30) | F(30) | F(30) | | F(33) | F(33) | F(33) |
| F2(t) | F(54) | F(54) | F(54) | F(22) | F(22) | F(22) | F(3) | | F(30) | F(30) | F(30) | | F(4) | F(4) | F(4) |

FREQUENCY HOP COLLISION PREDICTION IN A MULTI-CHANNEL, BLUETOOTH-ENABLED PACKET TRANSMISSION SYSTEM

RELATED APPLICATION

This application is related to applicants' application Ser. No. 10/054,134, filed Nov. 13, 2001, wherein a related invention is disclosed and claimed.

BACKGROUND OF THE INVENTION

This invention relates to packet transmission systems operating with Bluetooth transmission protocols and more particularly to Bluetooth-enabled devices employed in carrying out multi-channel transmission in such systems.

Bluetooth-enabled devices utilize spread-spectrum frequency hopping techniques to exchange packet data with other Bluetooth-enabled devices in a piconet after activation of radio connections (or channels) between radio modules associated with the respective devices. Pursuant to Bluetooth protocols, each "master" device that initiates such connection thereafter communicates with the associated "slave" devices through the transmission of packets of a unique channel hopping pattern in successive time slots. The frequency hops of each pattern in the successive time slots are distributed in a quasi-random manner within the Industrial-Scientific-Medical (ISM) band typically used for Bluetooth transmission.

Plural channels may be activated for simultaneous transmission to separate piconets by separate masters. The masters utilize radio modules operating with different channel hopping patterns within the Bluetooth band. One concern with such arrangements is that the quasi-random distribution of frequency hops of each channel hopping pattern on the activated channels can result in certain time slots wherein the separate channels exhibit identical frequency hops. If such coincidence occurs in channels that are within Bluetooth range of each other (typically 10–100 meters), such frequency "collisions" can lead to loss of transmitted information in the affected time slots.

In order to effectively control such problem it is first necessary to predict where and when such collisions will take place. Up to now, no reliable means for predicting the occurrence of such collisions have been available.

SUMMARY OF THE INVENTION

The present invention provides an effective technique for predicting the occurrence of collisions between frequency hops on the activated channels of a Bluetooth packet transmission system. Illustratively, such technique is implemented using an algorithm represented by a scannable matrix. A first coordinate of the matrix defines columns representative of a selectable block of N successive future time slots, and a second coordinate of the matrix defines rows each exhibiting the successive frequency hops occurring in a separate one of the activated channels during such block of time slots. The N successive time slots of the matrix are successively scanned to detect the occurrence, if any, of identical frequency hops at an intersection of the then-scanned column and at least a pair of the rows. The detection of such occurrence may then be employed to alter the information transmitted over one of the activated channels during the time slot associated with such intersection.

If a particular block of time slots scanned in the matrix does not yield an indication of a collision of frequency hops in any of the such time slots, the first coordinate of the matrix is illustratively incremented at the end of the scan to present an updated set of N time slots to the matrix for a repeated scan. An additional row may be added to the second coordinate of the matrix each time an additional channel is activated, such additional row exhibiting the frequency hops on the segment of the frequency hopping pattern present on the additional channel.

BRIEF DESCRIPTION OF THE DRAWING

These and other features of the invention are further set forth in the following detailed description taken in conjunction with the appended drawings, in which.

DETAILED DESCRIPTION

Figure 1:
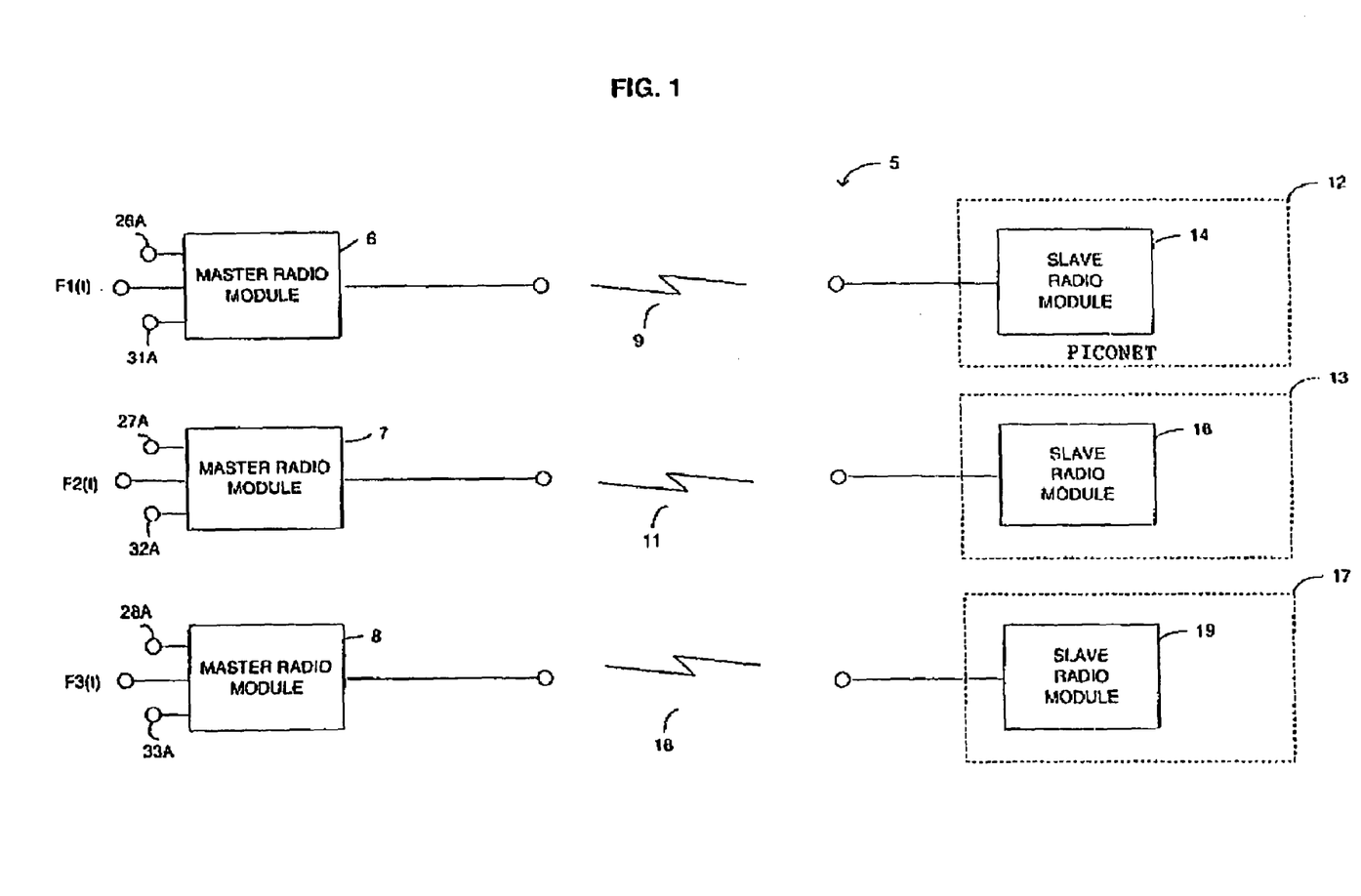
FIG. 1 is a block diagram illustrating a plurality of channels that may be separately activated by Bluetooth radio modules.

Referring now to the drawings, FIG. 1 shows a portion of a Bluetooth packet data transmission system 5 having a plurality of Bluetooth radio modules, three of which are shown and represented at 6, 7 and 8. It will be initially assumed that the modules 6 and 7 are "master" Bluetooth modules that have individually established active wireless connections or channels 9 and 11 with separate piconets 12 and 13 containing "slave" Bluetooth devices, two of whose radio modules are shown at 14 and 16, respectively. The third master radio module 8 is assumed to be initially quiescent, i.e., it has not yet initiated an active connection(s) with another piconet 17. Each of the radio modules shown in FIG. 1 is illustratively adapted to transmit selected frequencies in the 2.4 GHz band, which for Bluetooth operation is typically the Industrial-Scientific-Medical (ISM) band. Packet data to be exchanged over the active channel 9 between the modules 6 and 14 are formatted in accordance with standard Bluetooth protocols. In particular, the ISM-band frequencies generated by the radio module 6 are modulated in a first FH-CDMA channel hopping pattern F1(t). The pattern F1(t) conventionally utilizes successive discrete time slots each exhibiting a quasi-randomly selected one of seventy-nine 1 MHz frequency hops within the ISM bandwidth. Such frequency hops will hereafter be represented by f(0), f(1), f(2) . . . f(78). Note however, although the description that follows illustrates the invention using seventy-nine channels the invention is equally applicable where other channel spacing is available, e.g., twenty-three channels.

In like manner, packet data may be exchanged over the active channel 11 between the radio modules 7 and 16 utilizing a second channel hopping pattern F2(t). The pattern F2(t) has a different quasi-random distribution of frequency hops than F1(t). A third channel hopping pattern F3(t), different from F1(t) and F2(t), is associated with quiescent radio module 8 to format the transmission of packets from such module as a master after activation of a connection 18 to a slave radio module 19 associated with the piconet 17. Each of the respective radio modules 6, 7 and 8 is coupled to an associated one of radio interfaces 21, 22 and 23 (FIG. 2) that are co-located on a unitary Bluetooth terminal which is shown in relevant part at 24.

The radio modules 6, 7 and 8 are respectively provided with first interfaces 26A, 27A and 28A for transmitting clock counts to inputs 26B, 27B and 28B, respectively, of a baseband controller 29 in the terminal 24. For the situation depicted in FIGS. 1 and 2, the counts on interface 26A originate in a conventional manner from a free-running clock (not shown) which is associated with the master radio module 6 and which may be embodied by a 28-bit counter. In like manner, the counts at the interfaces 27A and 28A originate from similar free-running clocks associated with the radio modules 7 and 8, respectively. Each such free-running clock is independent of all the others. The clock counts from the interfaces 26A–28A are used by the controller 29 to derive the three channel hopping patterns F1(t), F2(t) and F3(t), respectively, on a one-to-one at the instant of establishment of the associated one of the channels 9, 11 and 18.

Figure 2:
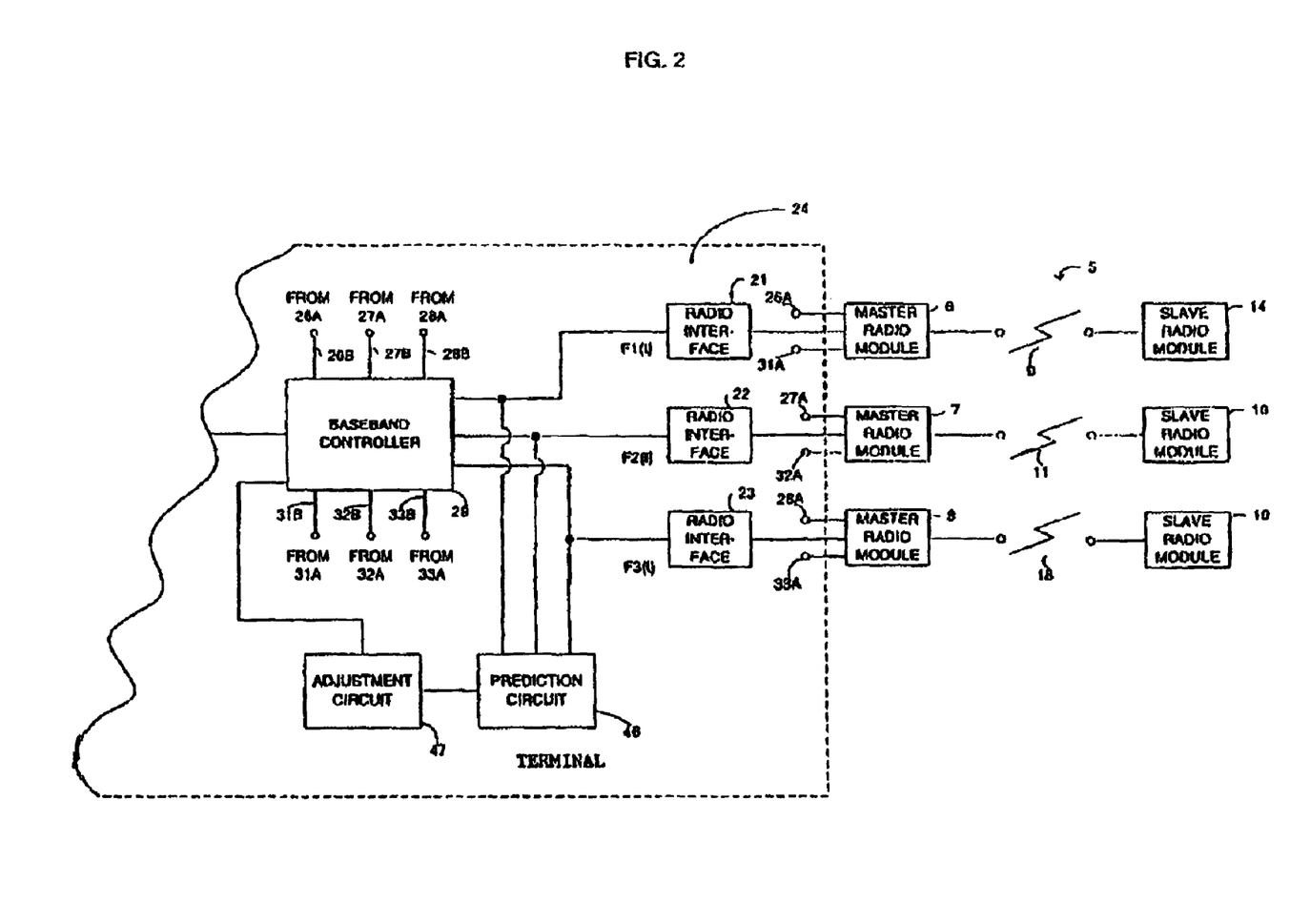
FIG. 2 is a block diagram of a portion of an illustrative Bluetooth-enabled terminal adapted to provide channel hopping patterns for the channels of FIG. 1, such terminal including facilities that implement an algorithm for predicting frequency collisions on the channels that are activated.

It will be understood that in practice one or more of the connections 9, 11 and 18 may be conventionally established in the reverse direction from that assumed in FIGS. 1 and 2. For example, the channel 9 may be established with the radio module 14 acting as a master and the module 6 acting as a slave. In such case, the count transmitted from the interface 26A of the module 6 to the baseband controller 29 will originate from a free running clock (not shown) associated with the module 14 and similar to the ones already mentioned.

The radio modules 6–8 also have second interfaces 31A, 32A and 33A for providing, to the controller 29, indications of unique, factory-set Bluetooth addresses of the master radio modules that establish the Bluetooth connections 9, 11 and 18, respectively. For this purpose, the interfaces 31A, 32A and 33A are respectively coupled to inputs 31B, 32B and 33B of the controller 29. Such unique Bluetooth addresses may be conventionally employed by the controller 29 in the generation of the channel hopping patterns F1(t), F2(t) and F3(t). In the depicted case where the master device for the channel 9 is the module 6, the Bluetooth address transmitted to the controller 29 from the interface 31A is that of the module 6 itself. Conversely, when the master device for the channel 9 is the module 14, the Bluetooth address transmitted to the controller 29 from the interface 31A is that of the module 14. The factory-set Bluetooth addresses for the radio modules connected through the channels 11 and 18 are handled in a corresponding manner through the interfaces 32A and 33A.

The so-generated channel hopping patterns from the controller 29 are coupled from outputs 41, 42 and 43 thereof to the respective radio interfaces 21–23. Such patterns are applied as modulating inputs to the respective radio modules 6, 7 and 8.

With the arrangement so far described in connection with FIGS. 1–2, the simultaneous transmission of packets over activated wireless connections of the system 5 may statistically exhibit identical frequency hops in certain future time slots. Because the co-located radio interfaces 21–23 and their associated radio modules 6–8 are in close proximity to each other, the collisions caused by the simultaneous occurrence of such frequency hops in the activated channels would cause a loss of packet communication during the time slots in question.

In accordance with the invention, the terminal 24 is provided with prediction circuit 46 for implementing, in an optimum manner, an algorithm that generates markers indicative of future time slots when collisions of the corresponding channel hopping patterns utilized on two or more of the active channels are expected to occur. Such markers may then be utilized by an adjustment circuit 47 to direct the controller 29 to alter the transmitted packets from a subset (preferably all but one) of the colliding active channels.

The algorithm contemplated by the invention is illustratively represented by a matrix 48 (FIG. 3), one of whose states is shown in two-dimensional form. It will initially be assumed that, as noted before, only the channels 9 and 11 (FIG. 2) are initially activated . Also, it will be assumed that the time slots of the transmitted channel hopping patterns F1(t) and F2(t) are synchronized with each other, and that the time slots of F3(t) will also be synchronized with those of F1(t) and F2(t) when the quiescent radio module 8 is activated to establish the channel 18.

The matrix 48 (FIG. 3) has a first coordinate exhibiting N columns. The columns are individually representative of a window of N successive time slots which are illustratively depicted as T(0), T(1) . . . T(N−1). Such time slots define a selectable block of future time slots of the channel hopping patterns. The matrix 48 also has second coordinates consisting of S rows, where S is the number of activated connections established by the terminal 24 and is therefore equal to two in the initial case assumed. The segments of F1(t) and F2(t) that occur during the time slots selected for the columns of the matrix populate the respective rows.

Each intersection of the first row of the matrix 48 (FIG. 3)with the successive columns represents the frequency hop of the corresponding pattern F1(t) that will occur in the time slot represented by such column. Similarly, each intersection of the second row with the successive columns represents the frequency hop of the corresponding pattern F2(t) that will occur in the time slot represented by such column.

As noted above, each of the channel hopping patterns F1(t), F2(t) and F3(t) is determined uniquely by particular clock count at the associated one of the interfaces 31A–33A (FIG. 2) when the corresponding Bluetooth channel is established. As a result, the frequency hops occurring during any particular N-time slot segment of the pattern are predetermined. Illustratively, the successive intersections of the columns and the first row of the matrix 48 (FIG. 3) are assumed to exhibit a predetermined F1(t) frequency hop sequence f(17), f(0), . . . f(12) over the time slots T(0), T(1), T(N−1). Similarly, the successive intersections of the columns and the second row are assumed to exhibit a predetermined F2(t) frequency hop sequence f(23), f(6), . . . f(55) for such time slots.

Figure 3:
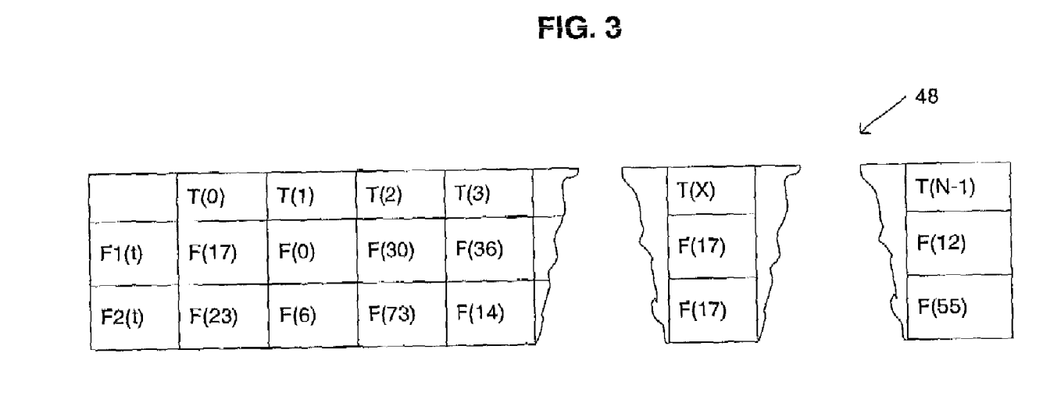
FIG. 3 is a diagram of a matrix representative of the prediction algorithm referred to in connection with FIG. 2 when each activated channel transmits data packets occupying a single time slot.

The successive columns of the matrix 48 shown in FIG. 3 may be scanned to compare the frequency hops in the first and second rows at each intersection of such rows and columns. Such N-time slot scan can be used to uncover any coincidences of frequency hops of patterns F1(t) and F2(t) in a time slot within the window covered by the scan. For example, when a scan through the matrix whose states are as shown in FIG. 3 reaches the time slot T(x), a comparison of the then-occurring frequency hops on the rows representing F1(t) and F2(t) indicates a collision in that time slot. As noted above, a marker indicative of such time slot is generated by the prediction circuit 46 (FIG. 2) and suitably utilized by the adjustment circuit 47 to take measures to preempt such collision.

One such measure may include directing the baseband controller 29 to alter a particular channel hopping pattern by changing the number of time slots occupied by a data packet to be transmitted on the associated channel. For example, in accordance with Bluetooth protocols, such packets may selectively occupy one, three or five time slots. Accordingly, the channel hopping patterns on the activated channels may, at a given time, separately exhibit frequency hops that change every time slot, every three time slots and every five time slots, respectively.

Figure 4:
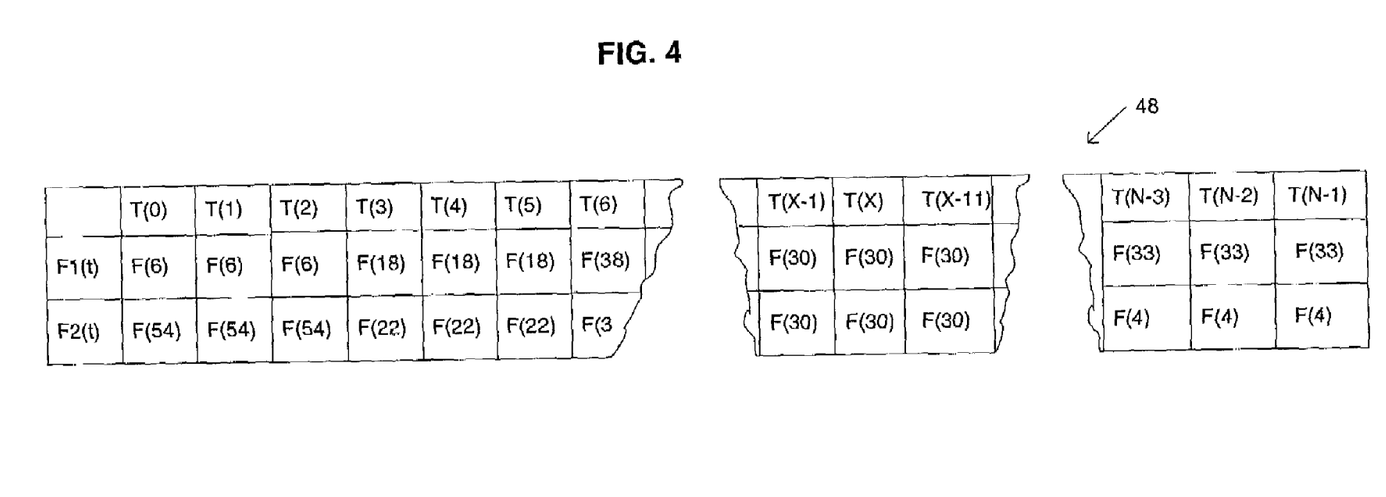
FIG. 4 is a diagram of a matrix representative of the prediction algorithm referred to in connection with FIG. 2 when each activated channel transmits data packets occupying three time slots.

The effect of such packet size alteration on the matrix 34 is illustrated in FIG. 4. The segments F1(t) and F2(t) on the activated channels 9 and 11 are displayed over the same block of future time slots T(0), T(1) . . . T(N−1) as in FIG. 3 but now represent packets occupying subgroups of three time slots each. As shown in FIG. 4, the successive intersections of the columns of the matrix and the first row depict the frequency hops of the segment F1(t) over the successive subgroups [T(0)-(T2)], [T(3)-T(5)], . . . . [T(N−3) T(N−1]. Similarly the intersections of the columns of the matrix and the second row depict the frequency hops of the segment F2(t) over the same subgroups of time slots. For the state of the matrix shown in FIG. 4, coincidences occur between the frequency hops of the first and second rows during a scan of the time slots in the subgroup [T(X−1), T(X), T(X+1)]. As indicated above, such collisions lead to the generation, by the prediction circuit 47 (FIG. 2), of a collision marker(s)) representative of such subgroup.

Figure 5:
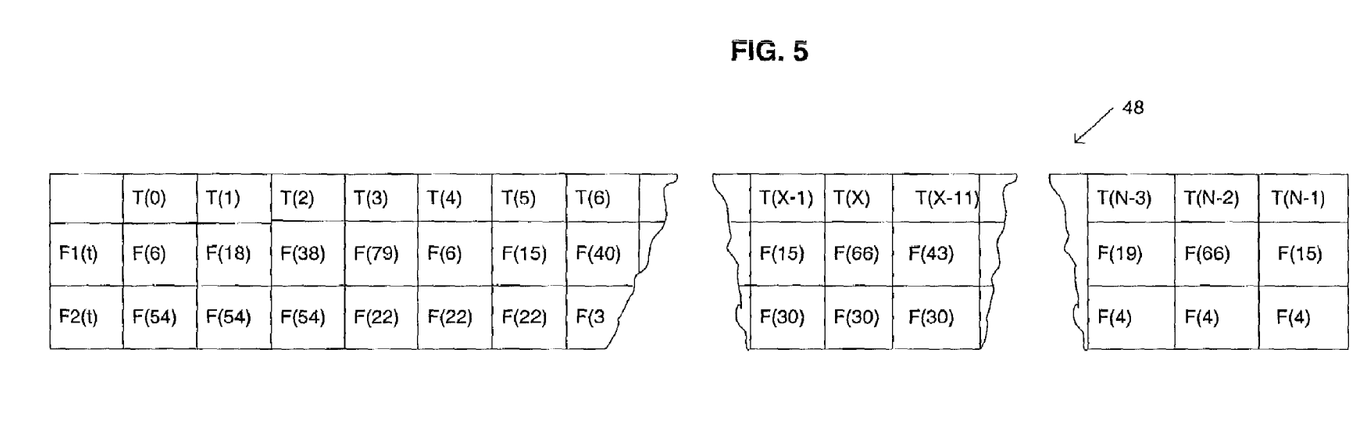
FIG. 5 is a modified diagram of the matrix of FIG. 4, showing how a collision predicted with the aid of the matrix of FIG. 4 is avoided by changing the packet size on one of the activated channels.

FIG. 5 shows an illustrative state of the matrix 48 after the packet size on one of the active channels shown in FIG. 2 (e.g., the channel 9) has been altered as indicated above. It will be assumed that the adjustment circuit 47 has directed the baseband controller 29 to reduce the size of the packets represented by the associated pattern F1(t) from three time slots to one time slot in a timely manner, i.e., in sufficient time to allow the radio modules 6 and 14 servicing the channel 9 to negotiate and execute such change prior to the occurrence of the block of future time slots T(0), T(1), . . . T(N−1) represented in the matrix 48. Note however, that there is no requirement to negotiate packet size between the master and slave because in accordance with our invention frequency collision detection and avoidance need only be applied to the master device since the slave device may read a field in the packet header received from the master to determine the packet length. As such, the packet size can change without alerting the slave devices beforehand.

The segment F2(t), indicative of the three-time-slot packet size of the data packets transmitted on the unaltered activated channel 11, is the same in FIGS. 4 and 5. However, because of the change in packet size on the channel 9, the segment F1(t) now exhibits frequency hops that change every time slot as shown. As a result, the frequency hops appearing in the respective first and second rows during the time slot segment [T(X−1), T(X), T(X+1)] in FIG. 5 no longer coincide as in FIG. 4, indicating that the predicted collision(s) has been avoided.

Referring again to FIG. 3, the matrix 34 can be incremented to allow for changes in each of its coordinates. For example, if a given scan through the N−1 time slot window of the first coordinate [i.e., the matrix columns representing the successive time slots T(0), T(1), . . . T(N−1)] yields no indication of a collision, each successive scan of the first coordinate can be incremented by a selectable number of time slot(s), preferably one from the start of the previous scan.

For example, with the one-time-slot increment just mentioned, the next-scanned window will be (T1), T(2), . . . T(N). In visual terms, this may entail (1) the removal of the frequency hop entries at the intersections of the two rows with the left-most column of the matrix; (2) a shift of the entries at each other intersection by one time slot to the left; and (3) the entry into the right-most column of the matrix of the predetermined frequency hops that would occur for the respective patterns F1(t) and F2(t) in the next time slot T(N). If a new scan through the so-incremented matrix still does not indicate a collision, the process can be repeated for as many iterations as the storage capacities of the implementing arrangement will allow.

Figure 6:
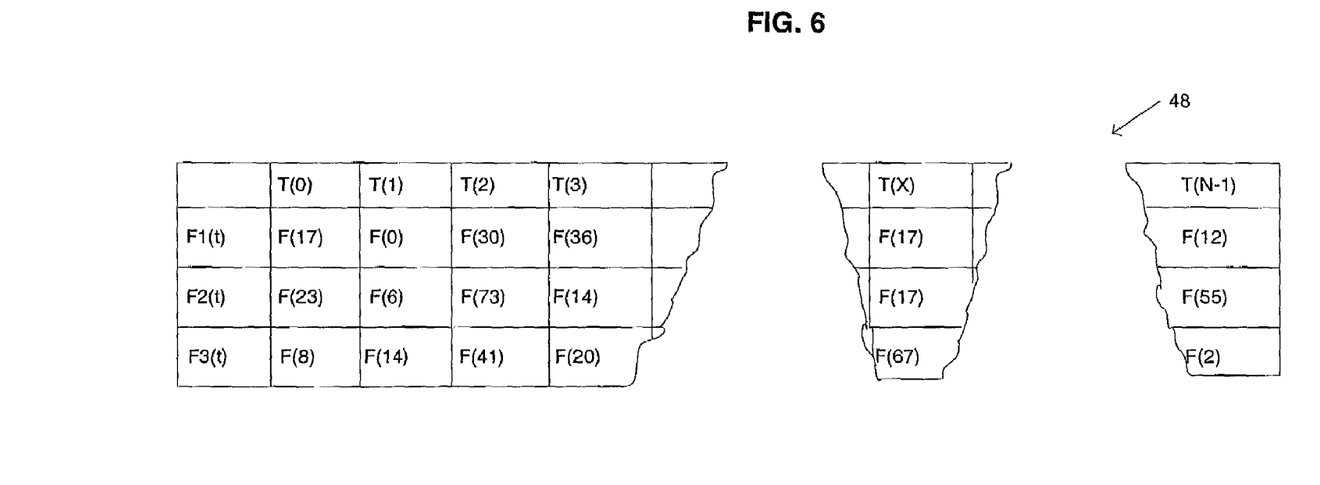
FIG. 6 is a modified diagram of the matrix of FIG. 3, showing the addition of a new row to the matrix when a previously quiescent channel associated with the terminal of FIG. 2 is activated.

Advantageously, incrementation on a selective basis can also be applied to the second coordinate of the matrix. For example, as depicted in FIG. 6, a third row can be added to the second coordinate of the matrix when a new connection is made, as when the initially quiescent master radio module 8 of FIG. 2 activates the connection 18 with the slave radio module 19. In such case, the intersections of the third row with the columns of the matrix of FIG. 6 represents the frequency hops that would occur in the associated channel hopping pattern F3(t) during each of the N time slots selected by the matrix. For the matrix state shown in FIG. 6, a collision would be indicated by a coincidence of at least two of the three frequency hop entries at the intersections of the three rows with one of the columns of the matrix.

Conversely, when an established Bluetooth channel is deactivated, the associated row in the second matrix coordinate that is indicative of such connection's channel hopping pattern can be deleted.

While the above discussion has assumed that the time slots of the channel hopping patterns for all the activated channels of the system 5 (FIG. 2) are synchronized, the technique just described may also be adapted to the case where the time slots for the different channels are not synchronized. For purposes of explanation, it will be assumed that the channel 9 used for transmission using the pattern F1(t) is activated earliest, followed by activation of the channel 11 for transmission using the pattern F2(t). Also, it will be assumed that the frequency hops to be entered in the first row for the segment of the pattern F1(t) will actually occur during the time slots T(0), T(1), T(N−1) shown in FIG. 3.

However, because the time slots of the patterns F1(t) and F2(t) are now assumed to be unsynchronized, the frequency hops to be entered in the second row for the pattern F2(t) will be different from those depicted for such row in FIG. 3. In particular, and although not specifically shown in the drawing, the frequency hops to be entered in the second row for the unsynchronized case will reflect the segment of the pattern F2(t) that would occur over the successive time slots T(A), T(A+1), ... T(A+N−1), where A is the time slot offset indicative of the delayed activation time of the channel 11 (FIG. 2).

Figure 7:
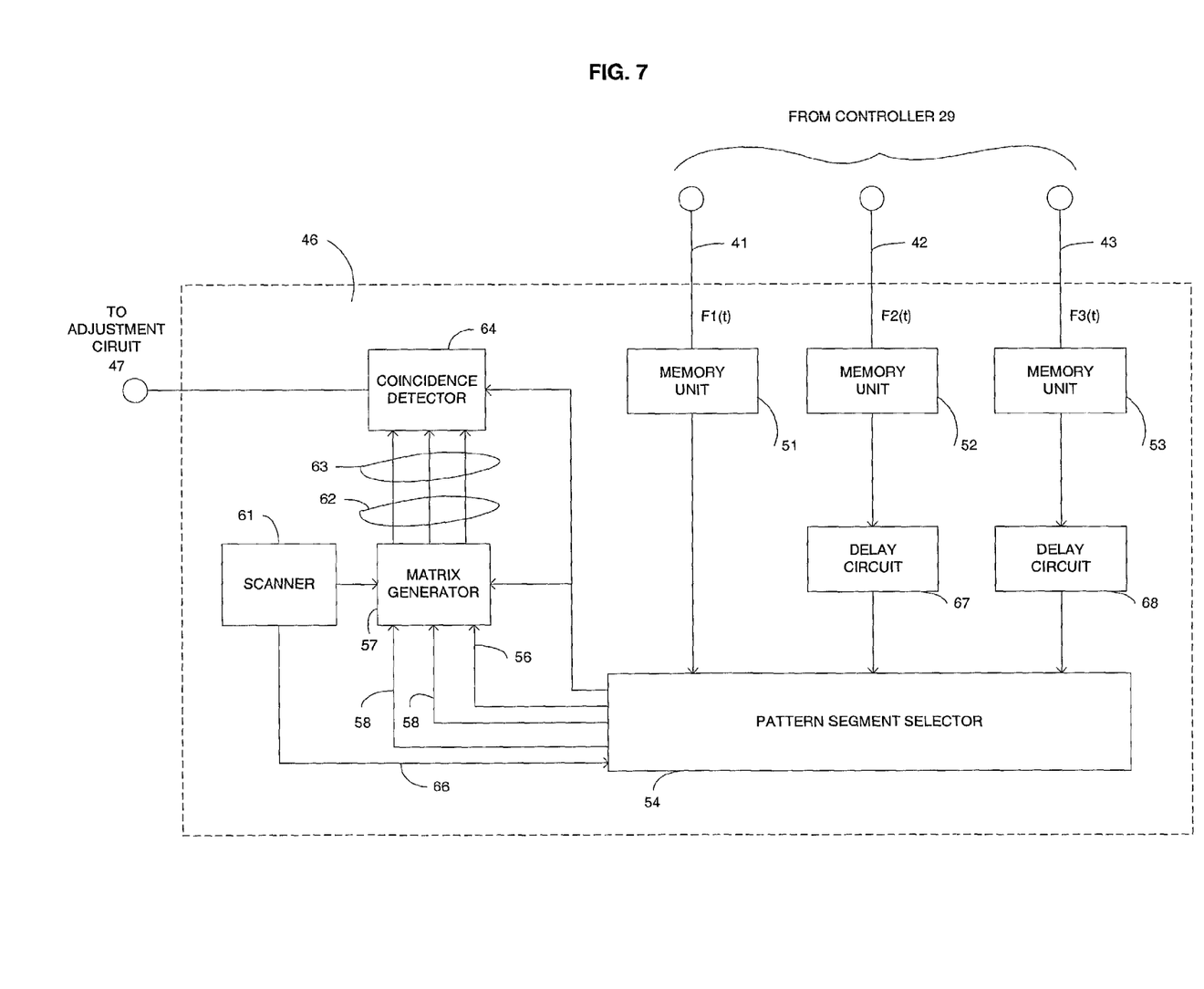
FIG. 7 is a block diagram of a prediction circuit in accordance with the invention for generating and utilizing the matrix of FIGS. 3 and 6 to determine frequency collision in the activated channels during a future time slot.

FIG. 7 illustrates an implementation, in further accordance with the invention, of the prediction circuit 46 that generates and utilizes the matrix 48 of FIGS. 3–4 for collision prediction. A plurality of channel memory units 51, 52 and 53 are respectively coupled to the outputs 41, 42 and 43 of the baseband controller 29 for storing the respective channel hopping patterns F1(t), F2(t) and F3(t) to the extent permitted by the caching capabilities of such memory units.

The outputs of the memory units 51–53 are coupled to an N-bit pattern segment selector 54 which extracts segments of the stored channel hopping patterns F1(t), F2(t) and F3(t) that occur over selectable N-time slot windows. Quantities representative of the time slots of each selected window are applied by the selector 54 to a first input 56 of a matrix generator 57 to define the columns established by the first coordinate of the matrix 48 (FIG. 3). The extracted segments of the channel hopping patterns F1(t), F2(t) and F3(t) occurring over such block of time slots are respectively applied by the selector 54 (FIG. 7) to second inputs 58 of the matrix generator 57 to define the respective rows of the second matrix coordinate.

A scanner 61 is coupled to the matrix generator 57 for scanning the successive time slots of the selected block then applied to the successive columns of the matrix 48 (FIG. 3). Each scan initiated by the scanner 61 (FIG. 7) searches for a coincidence, in the then-scanned time slot, of the frequency hops exhibited at the intersections of the then-scanned column and the rows of the matrix. (If, as assumed above, only the channels 9 and 11 in FIG. 2 are initially active, only the rows representative of the patterns F1(t) and F2(t) will be represented in the matrix). As the scan of the then-occurring block of time slots proceeds, the F1(t) and F2(t) frequency hops at the respective intersections of the matrix are successively presented at outputs 62 (FIG. 7) of the matrix generator 57.

Such outputs 62 are applied to respective inputs 63 of a coincidence detector 64. Also, time slot block indications from the selector 54 are applied to an input 66 of the detector 64. When the detector 64 senses a coincidence at the inputs 58 during the scan of a particular block of time slots, it generates a marker indicative of the time slot in which such coincidence occurs. Such marker, which constitutes the output of the prediction circuit 46 may then be utilized in the adjustment circuit 47 of FIG. 2 to alter transmission of packets through one of the then-active channels 9 and 11 that would otherwise exhibit a collision during such time slot.

At the conclusion of each scan that does not result in the generation of a coincidence at the outputs 58 of the matrix generator 57, the scanner 61 provides a control indication to an input 66 of the selector 54. In response, the selector 54 increments the matrix generator 57 to update the block of time slots representing the first coordinate of the matrix and to populate the matrix with the correct frequency hops corresponding to the updated block of time slots.

To permit the prediction circuit 46 to operate properly when the channel hopping patterns are not synchronized, suitable adjustable delay circuits 67 and 68 may be interposed between the outputs of the memory units 52 and 53 and the corresponding inputs of the segment selector 54. With this arrangement, one or both of the segments of F2(t) and F3(t) extracted by the selector 54 may be time-shifted relative to each other and to the corresponding extracted F1(t) segment before being applied to the inputs 58 of the matrix generator 57. As noted before, such time shift(s) represent offsets caused by differences in the relative activation times of the connections associated with the patterns F1(t), F2(t) and F3(t).

In the foregoing, the invention has been described in connection with an illustrative implementation thereof. Many variations and modifications will now occur to those skilled in the art. For example, while for clarity of description three activatable channels (and related channel hopping patterns) were considered in connection with the terminal 24 of FIG. 2, it will be understood that the principles of the invention would apply equally well to any reasonable number of such channels and patterns. In addition, while the channel hopping patterns F1(t), F2(t) and F3(t) have been illustrated as being applied to the input of the prediction circuit 46 from the outputs 41–43 of the controller 29, it will be understood the, if desired, such patterns also be re-created in the prediction circuit 46 from the clock counts and the factory-set Bluetooth addresses present at the interfaces 26A–28A and 31A–33A of the radio modules 6–8. It is accordingly desired that the scope of the appended claims not be limited to or by the specific disclosure herein contained.

What is claimed is:

1. A system for communicating packers on channels in accordance with Bluetooth protocols, said system comprising a plurality of radio modules, each of said modules having associated therewith an independent clock a plurality of radio interfaces, each of said interfaces being coupled to a respective one of said radio modules;

a base band controller coupled to said radio interfaces, said base band controller having first inputs receiving individual clock counts from individual clocks associated with said radio modules and second inputs receiving factory assigned Bluetooth addresses from said radio modules;

a prediction circuit for generating markers indicative of frequency collisions on said channels, said prediction circuit being coupled to said base band controller and including a matrix generator having a first coordinate representing a selectable number of successive future time slots and second coordinates respectively exhibiting channel hopping patterns of activated channels during such future time slots;

a scanner for scanning the first coordinates of the matrix to detect the occurrence, if any, of identical frequency hops at an intersection of a scanned first coordinate and a pair of second coordinates, such occurrence being indicative of a collision in the future time slot associated with such intersection;

a pattern segment selector;

memory units connected to said base band controller;

delay circuits connected between said memory units and said pattern segment selector whereby frequencies extracted by said selector may be time shifted before being applied to the said matrix generator to compensate for a lack of synchronization of channel hopping patterns, and wherein said selector responsive to said scanner provides a control signal to said matrix generator to increment the matrix generator; and an adjustment circuit coupled to said prediction circuit, said adjustment circuit causing said prediction markers to direct said base band controller to alter the transmission of data packets on said channels by altering the size of the data packets to allow multiple transmissions on said channels despite the generation of markers indicative of frequency collisions.

2. The system in accordance with claim 1 wherein said scanner is configured for repetitive scans of the first coordinates of the matrix, successive scans of the first coordinates being incremented by a selectable number of time slots at the end of each scan that does not detect such occurrence of a collision.

* * * * *

UNITED STATES PATENT AND TRADEMARK OFFICE
CERTIFICATE OF CORRECTION

| | | |
|---|---|---|
| PATENT NO. | : 7,139,285 B2 | Page 1 of 1 |
| APPLICATION NO. | : 10/016238 | |
| DATED | : November 21, 2006 | |
| INVENTOR(S) | : Agrawal et al. | |

It is certified that error appears in the above-identified patent and that said Letters Patent is hereby corrected as shown below:

In the Drawings

In Fig. 4, Sheet 3 of 5, in Line 3, delete "F(3" and insert -- F(3) --, therefor.

In Fig. 5, Sheet 4 of 5, in Line 3, delete "F(3" and insert -- F(3) --, therefor.

In Fig. 7, Sheet 5 of 5, for Tag "47", in Line 3, delete "CIRUIT" and insert -- CIRCUIT --, therefor.

In the Specification

In Column 2, Line 12, delete "DRAWING" and insert -- DRAWINGS --, therefor.

In Column 6, Line 14, delete "one from the" and insert -- one, from the --, therefor.

In the Claims

In Column 8, Line 27, in Claim 1, delete "packers" and insert -- packets --, therefor.

In Column 8, Lines 28-29, in Claim 1, delete "comprising" and insert -- comprising: --, therefor.

In Column 8, Line 31, in Claim 1, delete "clock" and insert -- clock; --, therefor.

In Column 8, Line 45, in Claim 1, delete "including" and insert -- including: --, therefor.

Signed and Sealed this
Eighteenth Day of November, 2014

Michelle K. Lee
*Deputy Director of the United States Patent and Trademark Office*